United States Patent [19]
Timko

[11] Patent Number: 5,849,251
[45] Date of Patent: Dec. 15, 1998

[54] CATALYTIC CONVERTER FOR A TAILPIPE INCLUDING APPARATUS FOR RELIEVING BACK PRESSURE

[76] Inventor: Mark Timko, 451 Erico Ave., Elizabeth, N.J. 07202

[21] Appl. No.: 794,177

[22] Filed: Feb. 3, 1997

Related U.S. Application Data

[63] Continuation-in-part of Ser. No. 618,492, Mar. 19, 1996, abandoned, which is a continuation of Ser. No. 502,919, Jul. 17, 1995, abandoned.

[51] Int. Cl.⁶ .................. B01D 53/34; F01N 3/10
[52] U.S. Cl. .................. 422/177; 422/171; 422/179; 422/180; 422/211; 422/221; 422/222; 55/DIG. 30; 60/287; 60/288; 60/299; 181/227
[58] Field of Search .................. 422/171, 174, 422/177, 179, 180, 199, 211, 221, 222; 55/DIG. 30; 60/299, 300, 287–288; 181/227, 228, 258

[56] References Cited

U.S. PATENT DOCUMENTS

| | | | |
|---|---|---|---|
| 2,288,943 | 7/1942 | Eastman | 422/171 |
| 3,457,723 | 7/1969 | Kerns | 181/228 |
| 3,492,098 | 1/1970 | De Palma et al. | 422/171 |
| 3,647,394 | 3/1972 | Wetch et al. | 60/287 |
| 3,675,398 | 7/1972 | Giarrizzo | 60/311 |
| 3,768,982 | 10/1973 | Kitzner et al. | 60/300 |
| 3,771,967 | 11/1973 | Nowak | 422/179 |
| 3,861,881 | 1/1975 | Nowak | 422/179 |
| 3,896,616 | 7/1975 | Keith et al. | 60/274 |
| 3,905,775 | 9/1975 | Sowards et al. | 422/180 |
| 4,020,539 | 5/1977 | Vroman | 422/180 |
| 4,161,509 | 7/1979 | Nowak | 60/299 |
| 4,407,785 | 10/1983 | Pfefferle | 422/180 |
| 4,530,418 | 7/1985 | Currie | 181/227 |
| 4,665,690 | 5/1987 | Nomoto et al. | 60/288 |
| 4,702,075 | 10/1987 | Jenny | 60/288 |
| 4,920,746 | 5/1990 | Gebelius | 60/299 |
| 4,993,512 | 2/1991 | Lescher | 181/227 |
| 5,106,588 | 4/1992 | Sims et al. | 60/299 |
| 5,110,561 | 5/1992 | Hitachi et al. | 422/180 |
| 5,186,906 | 2/1993 | Kawakami et al. | 422/180 |
| 5,191,763 | 3/1993 | Yuuki | 422/174 |
| 5,218,817 | 6/1993 | Urata | 60/299 |
| 5,285,640 | 2/1994 | Olivo | 60/274 |
| 5,365,025 | 11/1994 | Kraai et al. | 181/249 |
| 5,373,733 | 12/1994 | Fuchs et al. | 60/277 |

FOREIGN PATENT DOCUMENTS

3518756A1  11/1986  Germany .

*Primary Examiner*—Hien Tran
*Attorney, Agent, or Firm*—Ezra Sutton

[57] ABSTRACT

A catalytic converter for a tailpipe which further reduces vehicle exhaust emissions from exhaust emission systems and that will meet the more stringent emission requirements of state and federal government regulations. The tailpipe catalytic converter includes a ceramic or steel housing which includes a matrix core of catalytic layered materials which react with the exhaust emission pollutants, such as $NO_x$, NMHC, HC, and CO. These pollutants are further reduced and oxidized by the catalytic converter in the tailpipe by the typical catalytic materials of platinum, palladium, rhodium, or the like contained within the honeycombed or meshed layers of the matrix core. The catalytic converter is lodged within the interior of the tailpipe adjacent the open end or as an extension to the end of the tailpipe. The tailpipe catalytic converter is held in place by any suitable device, such as a clamp, mounting screws, or mounting brackets. The tailpipe catalytic converter includes a device for relieving back pressure, and may be used for other vehicles, such as trucks and motorcycles or other gas compression engines, i.e., lawn mowers.

22 Claims, 11 Drawing Sheets

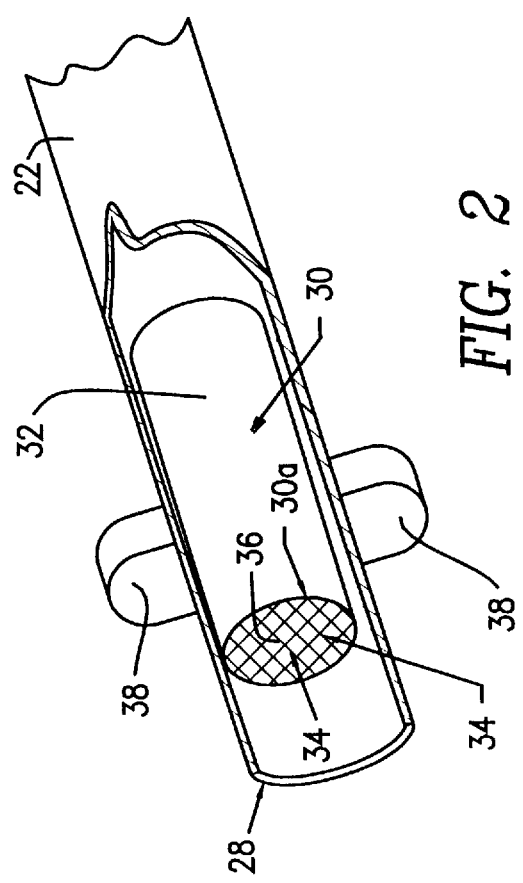
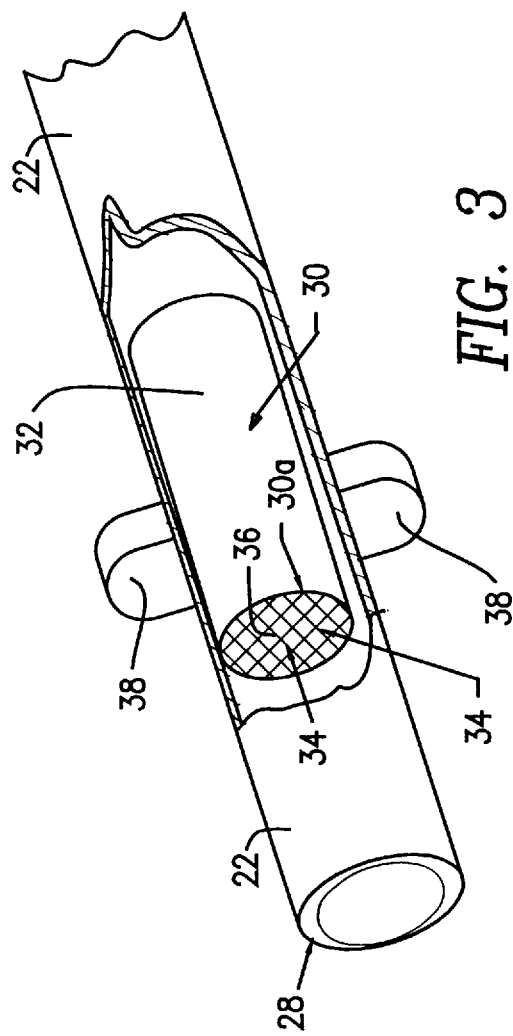

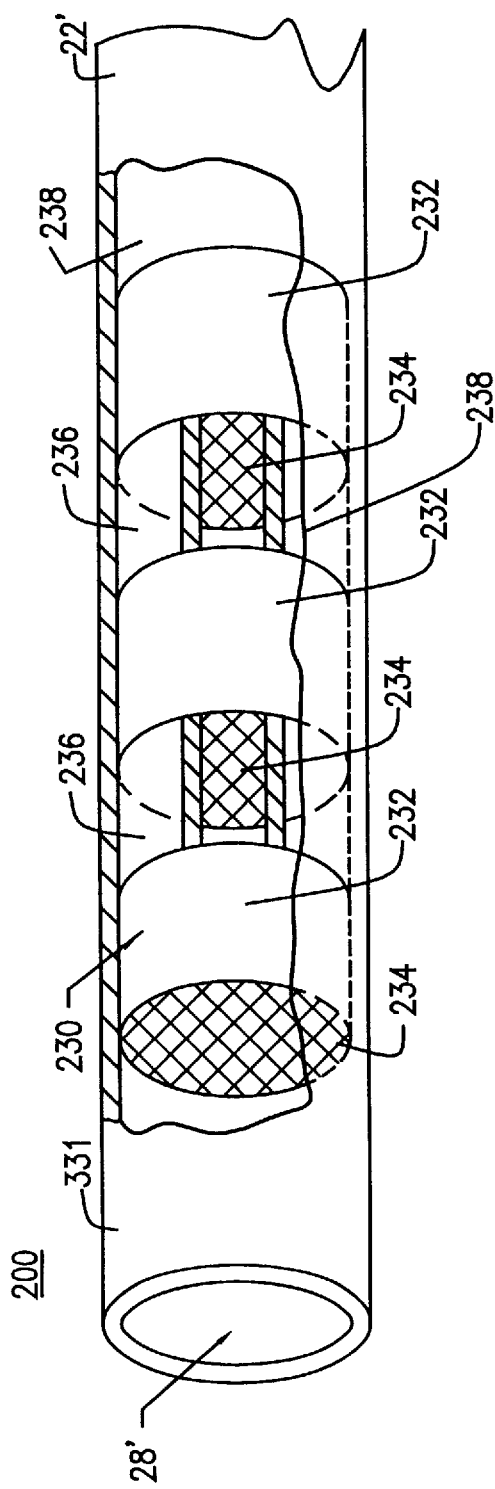
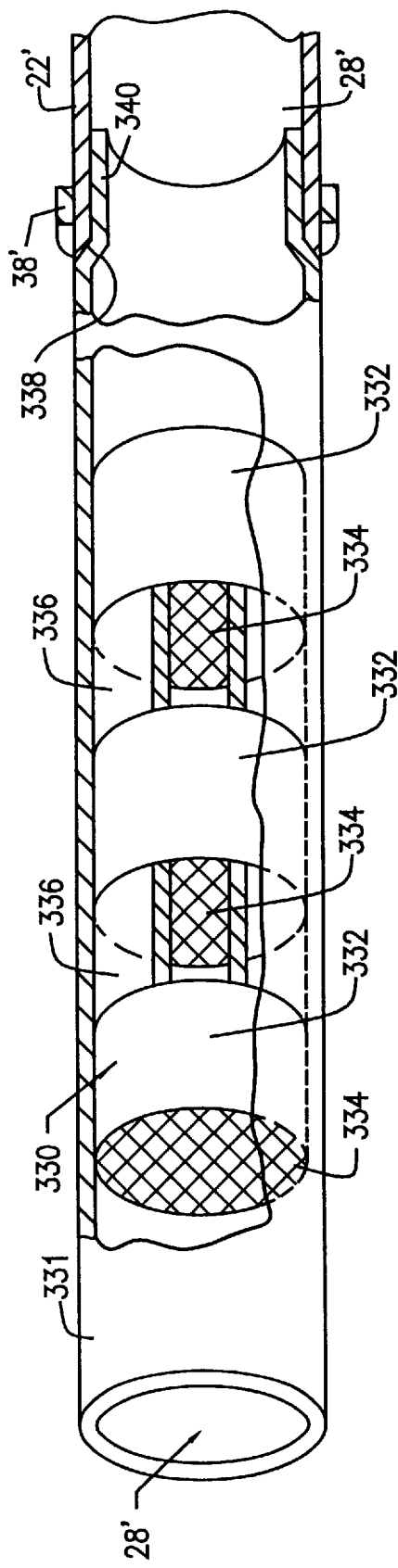

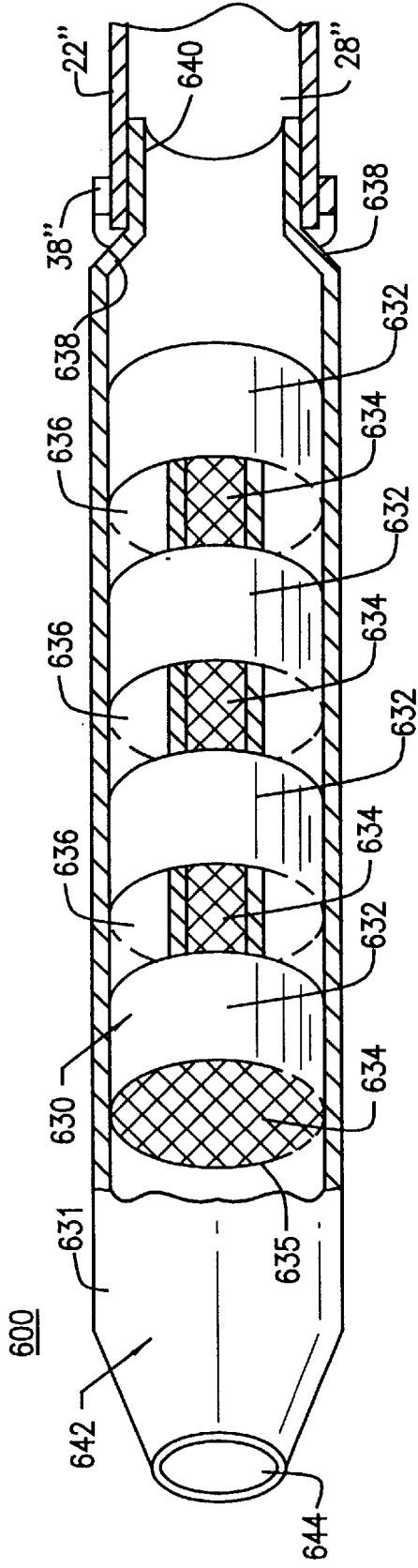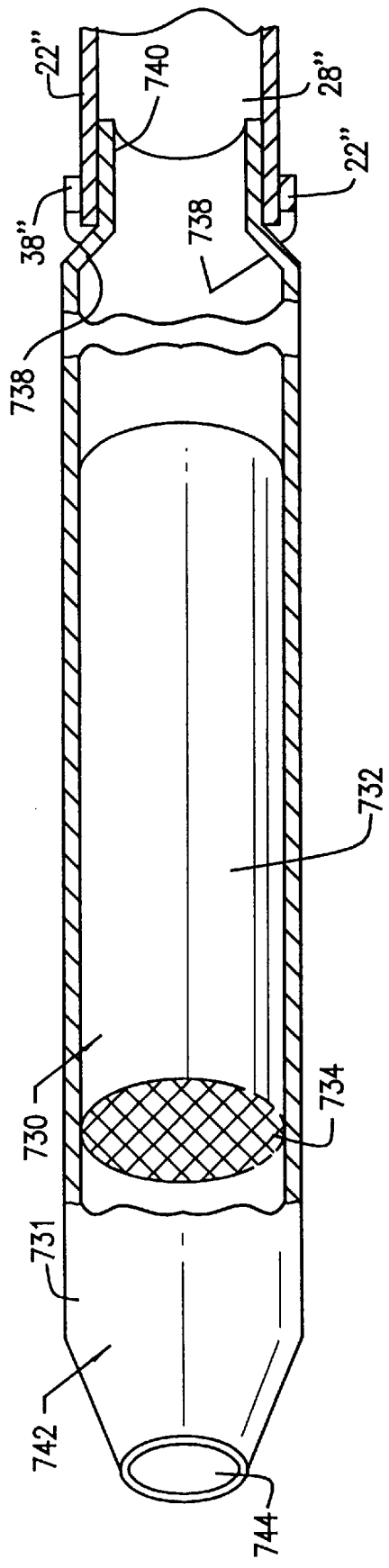
FIG. 9
FIG. 10

CATALYTIC CONVERTER FOR A TAILPIPE INCLUDING APPARATUS FOR RELIEVING BACK PRESSURE

This is a continuation-in-part of application Ser. No. 08/618,492, filed on Mar. 19, 1996 now abandoned, which is a continuation of application Ser. No. 08/502,919, filed on Jul. 17, 1995 now abandoned.

FIELD OF THE INVENTION

This invention relates to a tailpipe catalytic converter for exhaust gases from an internal combustion engine, and in particular, the catalytic converter is disposed at the open end of the tailpipe to further reduce emissions from standard vehicle emission systems.

BACKGROUND OF THE INVENTION

The exhaust emission gases generated by internal combustion engines found in automobiles, trucks, vans, and motorcycles are exhausted through a standard exhaust system. The standard exhaust system typically includes small diameter exhaust pipes extending from the engine block manifold to a catalytic converter; the catalytic converter is attached to a muffler device by a small connecting exhaust pipe; and an extended tailpipe is connected to the remote end of the muffler, the tailpipe having an open end to exhaust the emission gases to the atmosphere.

In recent years, emission standards issued by federal and state governments for vehicles have become increasingly stricter, so that the exhaust system catalytic converter is required to eliminate unburned hydrocarbons from the exhaust gases. The catalytic converters come in a variety of designs but typically have a precious metal catalyst, such as platinum, palladium, and/or rhodium, all plated over alumina or on a substrate of extruded ceramics. The catalytic converter designs are typically simple housings containing catalytic alumina pellets and, in some cases, have more complex containment systems, including honeycombed or meshed passageways containing a catalytic substrate. In all cases, the catalytic converter acts to oxidize the hydrocarbon emissions which reduces the pollutants emitted to the atmosphere.

Because of the stricter standards, a need exists for an improved emission exhaust system which further reduces the hydrocarbon emissions in order to meet the new vehicle federal and state standards for emission levels of $NO_x$, HC, CO, and NMHC. None of the prior art methods of reducing vehicle emissions for meeting the new federal and state emission guidelines discloses a tailpipe catalytic converter disposed in or at the open end of the tailpipe.

DESCRIPTION OF THE PRIOR ART

Catalytic converters of various designs and composite construction for vehicles have been disclosed in the prior art for many years. For example, U.S. Pat. No. 3,492,098 to DePalma et al discloses a catalyst device having spherical discs with the active catalyst located between the engine manifold and muffler and/or in the exhaust pipe section. U.S. Pat. Nos. 3,771,967 and 3,861,981 to Nowak disclose a honeycomb catalyst element located between the engine manifold exhaust system and muffler. U.S. Pat. No. 3,905,775 to Sowards et al discloses a cylindrical catalytic honeycombed module located between the engine manifold exhaust system and the muffler. U.S. Pat. No. 5,110,561 to Hitachi et al discloses a honeycomb core catalyst device that is generally installed at an intermediate point of an exhaust pipe. These aforementioned patents do not disclose disposing the catalytic converter at the open end of the tailpipe, as in the present invention, for the further reduction of exhaust emissions.

U.S. Pat. No. 4,530,418 to Currie discloses an improved catalytic exhaust system which uses the entire length of the system from the engine exhaust manifold to the end of the tailpipe opening. This system would replace the standard automotive catalytic converter and muffler and perform the essential functions of muffling noise and converting unburned hydrocarbons. U.S. Pat. No. 4,920,746 to Gebelius discloses a catalytic exhaust system which uses the entire length of the exhaust system from the engine exhaust manifold to the end of the tailpipe. This system would also replace standard catalytic converters and mufflers on cars. U.S. Pat. No. 5,218,817 to Urata discloses a silencer 2 having a catalyst 16 disposed therein. U.S. Pat. No. 4,020,539 discloses a catalytic reactor having an inlet and an outlet. These patents do not disclose a catalytic converter disposed in or at the tailpipe end section, as in the present invention.

German Patent No. DE3518756A1 discloses a catalytic converter to be disposed in the exhaust system at the joint of the muffler to the exhaust system. This patent does not disclose a catalytic converter adjacent to the open end of the tailpipe, as in the present invention.

Accordingly, it is an object of the present invention to provide a catalytic converter disposed in or at the end of the tailpipe to further reduce exhaust gas emissions to meet federal and state emission standards.

Another object of the present invention is to provide a catalytic converter disposed in or at the end of the tailpipe that is easy and simple to connect to the end of a tailpipe by mounting clamps, hose clamps, muffler clamps, compression fittings, mounting brackets, mounting screws, welding, crimping, or the like.

Another object of the present invention is to provide a catalytic converter that can be mounted internally in the open end of the tailpipe, or as an extension to the end of the tailpipe.

Another object of the present invention is to provide a catalytic converter that in operational use performs with no reduction or loss of horsepower to a vehicle.

Another object of the present invention is to provide a catalytic converter that in operational use provides substantially cleaner air emissions for a vehicle having installed the tailpipe catalytic converter of the present invention.

Another object of the present invention is to provide a tailpipe catalytic converter having a back pressure relief valve that maintains the back pressure of the emission system at a predetermined level.

Another object of the present invention is to provide a tailpipe catalytic converter having a back pressure relief valve that allows excess back pressure to be diverted from the tailpipe catalytic converter and to bypass the inner core to maintain the efficiency of the system.

Another object of the present invention is to provide a tailpipe catalytic converter having a back pressure relief valve that is in the form of either a bleed valve, or a miniature check valve, or a miniature pressure relief valve for relieving any build-up of pressure within the emission system at the inlet side of the tailpipe catalytic converter to maintain the efficiency of the system.

A further object of the present invention is to provide a catalytic converter for a tailpipe that is only changed at every 50,000 to 100,000 miles of driving use.

A still further object of the present invention is to provide a catalytic converter for a tailpipe which can be mass produced in an automated and economical manner and is relatively inexpensive and long lasting.

SUMMARY OF THE INVENTION

The present invention provides a catalytic converter for a tailpipe which further reduces vehicle exhaust emissions from exhaust emission systems and that will meet the more stringent emission requirements of state and federal government regulations. The tailpipe catalytic converter comprises a ceramic or steel housing of relatively small size, having a diameter in the range of ½ inch to 8 inches and a length of ¾ inches to 11 inches. The housing includes a matrix core of catalytic layered materials which react with the exhaust emission pollutants, such as $NO_x$, NMHC, HC, and CO. These pollutants are further reduced and oxidized by the catalytic converter in the tailpipe by the typical catalytic materials of platinum, palladium, rhodium, or the like contained within the honeycombed or meshed layers of the matrix core. The catalytic converter is lodged within the interior of the tailpipe adjacent the open end or as an extension to the end of the tailpipe. The tailpipe catalytic converter is held in place by any suitable means, such as a clamp, mounting screws, mounting brackets, or the like. The converter includes a device for relieving back pressure. Also, the tailpipe catalytic converter can be used for other vehicles, such as trucks and motorcycles or other gas compression engines, i.e., lawn mowers.

Empirical data had been obtained (shown below) on different vehicles, with and without a catalytic converter in the tailpipe, to show the advantages of the present invention.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein:

FIG. 2 is a perspective view of the tailpipe catalytic converter having a honeycomb matrix;

FIG. 3 is a perspective view of a second embodiment of the tailpipe catalytic converter disposed within the tailpipe section;

FIG. 5 shows the fourth embodiment of the present invention;

FIG. 6 shows the fifth embodiment of the present invention;

FIG. 9 shows the eighth embodiment of the present invention;

FIG. 10 shows the ninth embodiment of the present invention;

DETAILED DESCRIPTION OF THE PREFERRED EMBODIMENTS

Figure 1:
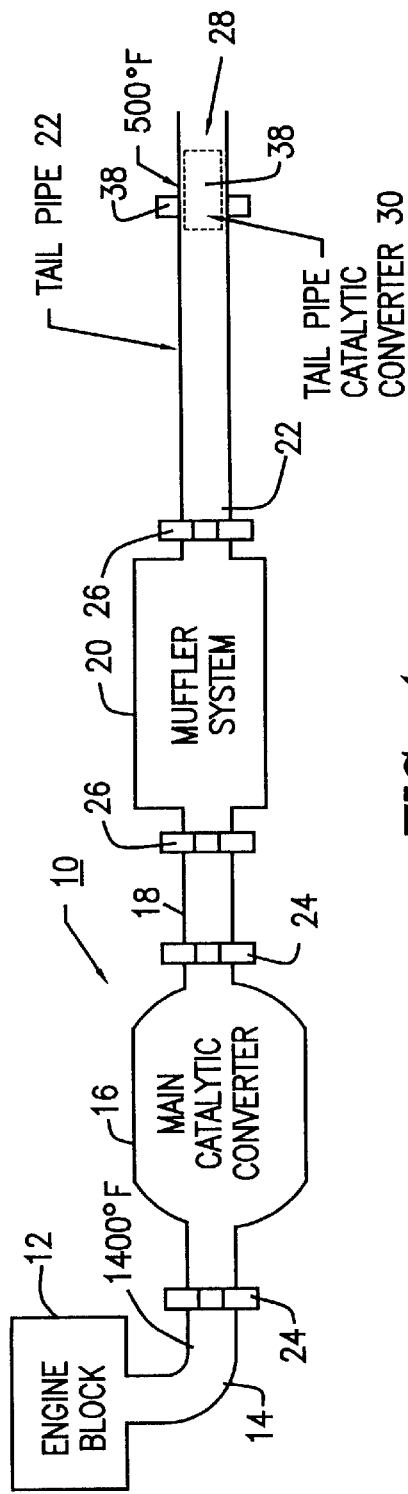
FIG. 1 is a bottom plan view of a standard vehicle exhaust system incorporating the catalytic converter disposed in the tailpipe of the present invention.

One embodiment of the present invention provides a catalytic converter 30 disposed within a tailpipe 22 section, as represented in FIGS. 1, 2, and 3. FIG. 1 shows a standard and conventional exhaust system 10 for a typical motor vehicle. This exhaust system 10 comprises an exhaust manifold duct 14 connected to an internal combustion engine 12, and the manifold duct 14 is also connected to the primary catalytic converter 16 having an exhaust pipe 18. Exhaust pipe 18 is connected to a conventional muffler 20 and an elongated tailpipe 22. The tailpipe catalytic converter 30 is disposed within the open end of tailpipe 22 adjacent opening 28, as depicted in FIGS. 1 and 2 of the drawings. The end 30a of catalytic converter 30 is preferably spaced about 1 inch from the tailpipe opening 28, but may be spaced up to 6 inches from opening 28.

The primary catalytic converter 16 is held in place by mounting clamps 24, the muffler 20 is held in place by mounting clamps 26, and the tailpipe catalytic converter 30 is held in place by a mounting clamp 38 for exhaust system 10.

The tailpipe catalytic converter 30, as depicted in FIGS. 2 and 3, is of generally conventional construction and includes a cylindrical housing 32 having a matrix core 34 of catalytic layered material 36, which reacts with emission gaseous pollutants, such as THC, $NO_x$, NMHC, and CO. Housing 32 is made of ceramic, steel, stainless steel, chrome, or other suitable materials. The core matrix 34 is made of mesh, honeycomb, or other suitable passageway designs for containing the catalytic layered materials 36. The catalytic layered materials 36 have a precious metal catalyst contained thereon. Typical catalysts used are platinum, palladium, rhodium, and/or nickel. The housing 32 of catalytic converter 30 is typically dimensioned so that the outside diameter closely approximates the inside diameter of tailpipe 22. The diameter size may be in the range of ½ inches to 8 inches, and the housing 32 may have a length of ¾ inches to 11 inches, depending upon the application, such as in a car, truck, motorcycle, lawn mower, and/or gasoline-type generator.

The preferred specification of matrix core 34 includes a diameter which matches the tailpipe of 1¾ inches and a length of 1¾ inches and having a range of 200 to 700 cells per square inch. Typically, two, three, or four of such matrix cores 34 are stacked together to make the catalytic converter 30, with a preferred length of 6 inches. The matrix core 34 is coated with alumina to about 12% (weight to weight) and has a catalytic layered material plating 36 of palladium and platinum in the range of 30 to 50 grams per cubic foot with a ratio of palladium to platinum in the range of 2:1 to 6:1.

The catalytic converter 30 is held in place in tailpipe 22 by a suitable mounting clamp 38, as depicted in FIGS. 1 to 3. It can also be securely held by other suitable means, such as hose clamps, muffler clamps, compression fittings, mounting brackets, mounting screws, welding, crimping, and the like.

FIG. 3 shows a second embodiment in which the catalytic converter 30 is disposed about 6 inches from open end 28. The catalytic converter 30 is clamped in the same manner, as previously discussed for the first embodiment.

In operation, catalytic converter 30 reaches a temperature of approximately 500° F. to burn off the pollutants before they are exhausted to the atmosphere.

The present invention has been tested on different vehicle exhaust systems 10, such as a 1990 Mazda Miata, a 1991

Ford Bronco, and a 1993 Dodge Intrepid. In these tests, the tailpipe catalytic converter 30 had a housing 32 which measured 6 inches in length and had a diameter of 2 inches, which closely approximates the inside diameter of the tailpipe 22. The catalytic converter 30 was installed in tailpipe 22 and was placed and clamped with end 30a approximately 1 inch from opening 28. The test results are tabulated below in Tables 1 to 4 and show a substantial reduction in exhaust emissions when tailpipe catalytic converter 30 is mounted at the end of tailpipe 22, as shown in FIGS. 1 and 2 of the drawings. The test results also show that there was no adverse affect on gas mileage when using the catalytic converter 30.

TABLE 1

1990 Mazda Miata

| Vehicle | MIATA | TEST TYPE | | I/M-240 | | | |
|---|---|---|---|---|---|---|---|
| Test No. | With/Wo | THC | CO | NOx | CO2 | NMHC | MPG | Date |
| 2488 | WO | 0.099 | 1.511 | 1.388 | 309.552 | 0.07 | 28.4 | 11/9/94 |
| 2490 | WO | 0.126 | 1.73 | 1.544 | 311.985 | 0.086 | 28.14 | 11/9/94 |
| 2492 | WITH | 0.067 | 1.219 | 1.33 | 314.649 | 0.04 | 27.99 | 11/9/94 |
| 2495 | WO | 0.141 | 2.007 | 1.497 | 309.46 | 0.106 | 28.33 | 11/9/94 |
| 2496 | WO | 0.121 | 1.645 | 1.509 | 314.339 | 0.08 | 27.95 | 11/9/94 |
| % REDUX | | 44.9692 | 29.26157 | 10.40754 | −1.064773 | 53.21637 | 0.762276 | |
| HOT 505 | | | | | | | | |
| 2497 | WO | 0.141 | 1.704 | 1.285 | 308.281 | 0.105 | 28.48 | 11/10/94 |
| 2498 | WO | 0.142 | 2.043 | 1.331 | 314.004 | 0.103 | 27.92 | 11/10/94 |
| 2499 | WO | 0.174 | 1.858 | 1.372 | 308.207 | 0.134 | 28.45 | 11/10/94 |
| 2509 | WITH | 0.061 | 1.07 | 0.595 | 306.198 | 0.031 | 28.64 | 11/10/94 |
| 2510 | WITH | 0.096 | 1.335 | 0.731 | 309.498 | 0.061 | 28.29 | 11/10/94 |
| 2511 | WITH | 0.059 | 0.811 | 0.811 | 305.571 | 0.03 | 28.84 | 11/10/94 |
| 2512 | WITH | 0.06 | 1.064 | 0.84 | 306.839 | 0.034 | 28.58 | 11/10/94 |
| % REDUX | | 54.7046 | 42.72971 | 44.01329 | 1.011562 | 65.78947 | −1.075427 | |
| HWFET | | | | | | | | |
| 2501 | WO | 0.04 | 0.46 | 1.251 | 256.664 | 0.027 | 34.44 | 11/10/94 |
| 2503 | WO | 0.039 | 0.23 | 1.524 | 277.761 | 0.026 | 31.88 | 11/10/94 |
| 2504 | WO | 0.035 | 0.514 | 1.223 | 256.556 | 0.022 | 34.44 | 11/10/94 |
| 2505 | WITH | 0.031 | 0.181 | 1.081 | 255.082 | 0.019 | 34.71 | 11/10/94 |
| 2507 | WITH | 0.029 | 0.124 | 1.194 | 256.055 | 0.018 | 34.59 | 11/10/94 |
| % REDUX | | 21.05263 | 62.00166 | 14.64482 | 3.069037 | 26 | −3.165939 | |

TABLE 2

12/21 1991 Ford Bronco

| Vehicle | BRONCO | TEST TYPE | | I/M-240 | | | |
|---|---|---|---|---|---|---|---|
| Test No. | With/Wo | THC | CO | NOx | CO2 | NMHC | MPG |
| 2477 | WITH | 0.248 | 2.382 | 2.268 | 524.732 | 0.172 | 16.76 |
| 2478 | WITH | 0.301 | 3.623 | 1.902 | 524.163 | 0.216 | 16.71 |
| 2479 | WITH | 0.479 | 11.372 | 1.701 | 521.147 | 0.365 | 16.41 |
| 2480 | WITH | 0.31 | 2.801 | 1.892 | 535.879 | 0.236 | 16.38 |
| 2481 | WO | 0.43 | 6.768 | 1.98 | 573.886 | 0.318 | 15.14 |
| 2482 | WO | 0.457 | 11.557 | 1.965 | 557.284 | 0.345 | 15.37 |
| 2483 | WO | 0.512 | 11.795 | 1.866 | 573.85 | 0.393 | 14.93 |
| 2484 | WO | 0.531 | 11.604 | 1.993 | 573.708 | 0.397 | 14.94 |
| 2485 | WITH | 0.367 | 6.164 | 1.744 | 529.409 | 0.257 | 16.41 |
| 2486 | WITH | 0.404 | 7.096 | 1.728 | 530.284 | 0.29 | 16.34 |
| 2487 | WO | 0.438 | 8.163 | 2.054 | 576.438 | 0.334 | 15.01 |

TABLE 3

1993 Dodge Intrepid
VIN 2B3ED46TXPH558688   All units are in Grams/Mile
Odometer approx 102000 miles   Test Type- FTP (Federal Test Procedure)

| Test No | THC | CO | NOx | CO2 | NMHC | MPG |
|---|---|---|---|---|---|---|
| With Tail Pipe Cat | | | | | | |
| 2882 | 0.407 | 3.422 | 0.355 | 345.276 | 0.358 | 25.23 |
| 2886 | 0.387 | 3.902 | 0.357 | 344.835 | 0.338 | 25.21 |
| 2889 | 0.394 | 3.022 | 0.378 | 337.576 | 0.353 | 25.84 |
| 2893 | 0.401 | 3.333 | 0.396 | 344.287 | 0.354 | 25.31 |
| 2894 | 0.386 | 3.167 | 0.372 | 349.412 | 0.340 | 24.97 |

TABLE 3-continued

1993 Dodge Intrepid
VIN 2B3ED46TXPH558688   All units are in Grams/Mile
Odometer approx 102000 miles   Test Type- FTP (Federal Test Procedure)

| Test No | THC | CO | NOx | CO2 | NMHC | MPG |
|---|---|---|---|---|---|---|
| AVG | 0.395 | 3.369 | 0.372 | 344.277 | 0.349 | 25.31 |
| | Baseline No Device | | | | | |
| 2872 | 0.448 | 3.813 | 0.460 | 439.263 | 0.398 | 19.88 |
| 2900 | 0.466 | 3.265 | 0.628 | 444.114 | 0.412 | 19.70 |
| 2901 | 0.448 | 3.560 | 0.571 | 442.133 | 0.396 | 19.77 |
| 2907 | 0.587 | 4.148 | 0.575 | 434.548 | 0.524 | 20.05 |
| AVG | 0.487 | 3.697 | 0.559 | 440.015 | 0.433 | 19.85 |
| % REDUX | 18.93279 | 8.854322 | 18.69 | 21.75776 | 19.39884 | −27.5164 |

TABLE 4

1990 Mazda Miata
VIN JM1NA3515L0105501
Odometer 32600 miies approx

| | THC | CO | NOx | CO2 | NMHC | MPG |
|---|---|---|---|---|---|---|
| Baseline No Device | | | | | | |
| 2803 | 0.322 | 3.104 | 0.744 | 332.781 | 0.293 | 26.22 |
| With Device | | | | | | |
| 2819 | 0.262 | 2.536 | 0.564 | 321.179 | 0.229 | 27.24 |
| % REDUX | 18.63354 | 18.29897 | 24.19355 | 3.486377 | 21.843 | '13.89016 |

DETAILED DESCRIPTION OF THE THIRD EMBODIMENT 100

Figure 4:
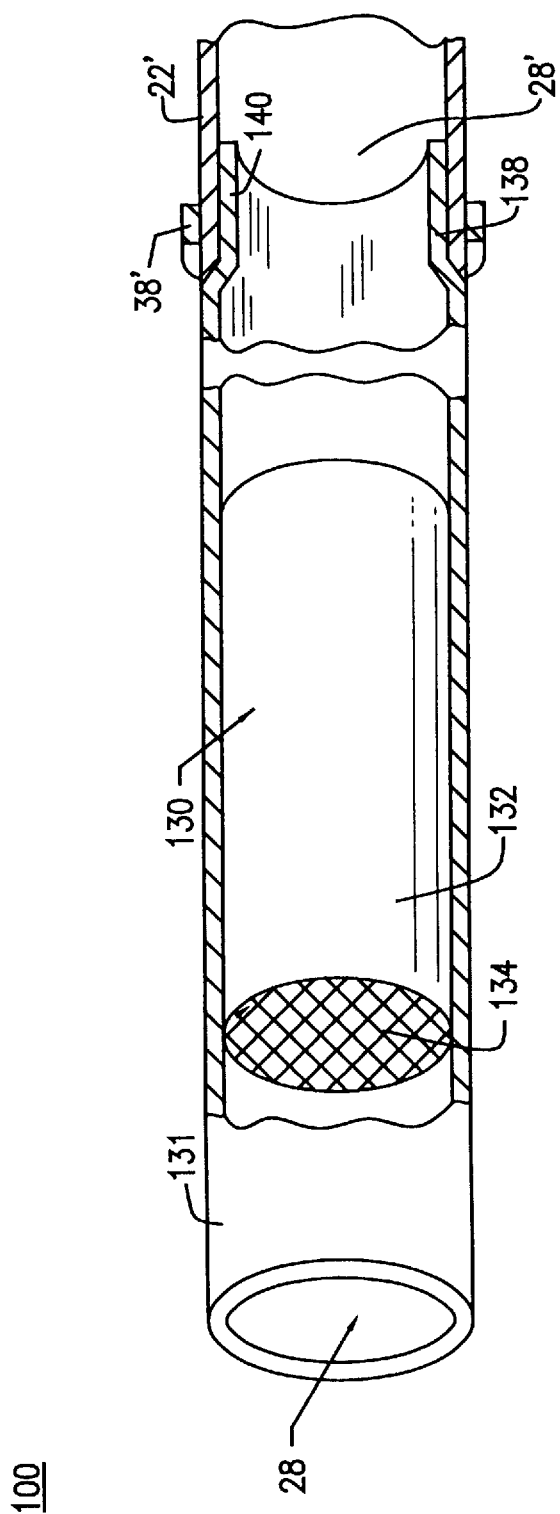
FIG. 4 shows the third embodiment of the present invention.

The third embodiment 100 of the tailpipe catalytic converter is depicted in FIG. 4 of the drawings. The third embodiment 100 includes a tailpipe catalytic converter 130 which is the same as the first embodiment of catalytic converter 30, except for the canister-type housing 131 containing a core housing 132 having a matrix core 134. End 138 of housing 131 is slightly tapered having neck section 140 for fitting into the open end 28' of tailpipe 22'. Housing 131 of catalytic converter 130 is secured to tailpipe 22' by means of clamp 38', crimping, welding or other previously mentioned securing devices.

The physical specifications for housing 131 generally match the dimension of the tailpipe 22'. The diameter is in the range of ¾ inches to 8 inches and the overall length is in the range of ¾ inches to 11 inches, with a preferred diameter of 2 to 4 inches and a preferred length of 5 to 6 inches. Housing 131 has a slightly tapered end 138 having a diameter of less than 2 inches and a neck length of 2 inches for fitting neck portion 140 into tailpipe opening 28' of tailpipe 22' for a proper fit. The preferred physical specification for the core housing 132 having matrix core 134 is a diameter of 1¾ inches and a length of 6 inches.

DETAILED DESCRIPTION OF THE FOURTH EMBODIMENT 200

The fourth embodiment 200 of the tailpipe catalytic converter 230 is depicted in FIG. 5 of the drawings. The fourth embodiment 200 includes a tailpipe catalytic converter 230 which is the same as tailpipe catalytic converter 130, except for the number and spacing of core housings 132 and matrix cores 134 within the tailpipe 22'. Catalytic converter 230 has three spaced-apart core housings 232 each having a length of 2 inches and each having a matrix core 234. A one inch (1") length metal spacing collar 236 has an annular shape and separates each matrix core 234, as shown in FIG. 5. The two spacing collars 236 allow for a lowering of back pressure caused by the catalytic converter 230. Preferably, spacing collar 236 has a 1¾ inch diameter and a 1 inch length. In addition, the air space 238 between each matrix core 234 allows for further catalytic conversion of the exhaust gases at each matrix core 234. When exhaust gases pass through each matrix core 234 from a subsequent air space 238, the process of catalytic conversion takes place each time. Each matrix core 234 can be secured in place by a mounting clamp 38' or other suitable means, such as hose clamps, muffler clamps, compression fittings, mounting brackets, mounting screws, welding, crimping, or the like. The physical specifications for the catalytic converter 230 within tailpipe 22' are preferably a diameter of 2 inches and an overall length of 8 inches including the two spacing collars 236. However, the length may vary from 2½ inches to 11 inches.

DETAILED DESCRIPTION OF THE FIFTH EMBODIMENT 300

The fifth embodiment 300 of the tailpipe catalytic converter 330 is depicted in FIG. 6 of the drawings. The fifth embodiment 300 includes a tailpipe catalytic converter 330 which is the same as the fourth embodiment 200 of tailpipe catalytic converter 230, except for the canister-type housing 331 containing three spaced-apart core housings 332 each having a matrix core 334 and a spacing collar 336 between them. Housing 331 has at one end a slightly tapered end 338 and a neck section 340 for slidably fitting into tailpipe 22'. Housing 331 may be secured to tailpipe 22' by clamp 38' or by crimping, welding, or other previously mentioned securing devices.

The physical specifications for converter 330 are a diameter of 2.3 inches, and an overall length of 2 to 8 inches. Housing 331 has an overall length of 13 inches and a slightly tapered end 338 having a diameter of less than 2 inches. The length of neck 340 is 2 inches for inserting neck portion 340 into tailpipe opening 28' of tailpipe 22' for a proper fit.

DETAILED DESCRIPTION OF THE SIXTH EMBODIMENT 400

Figure 7:
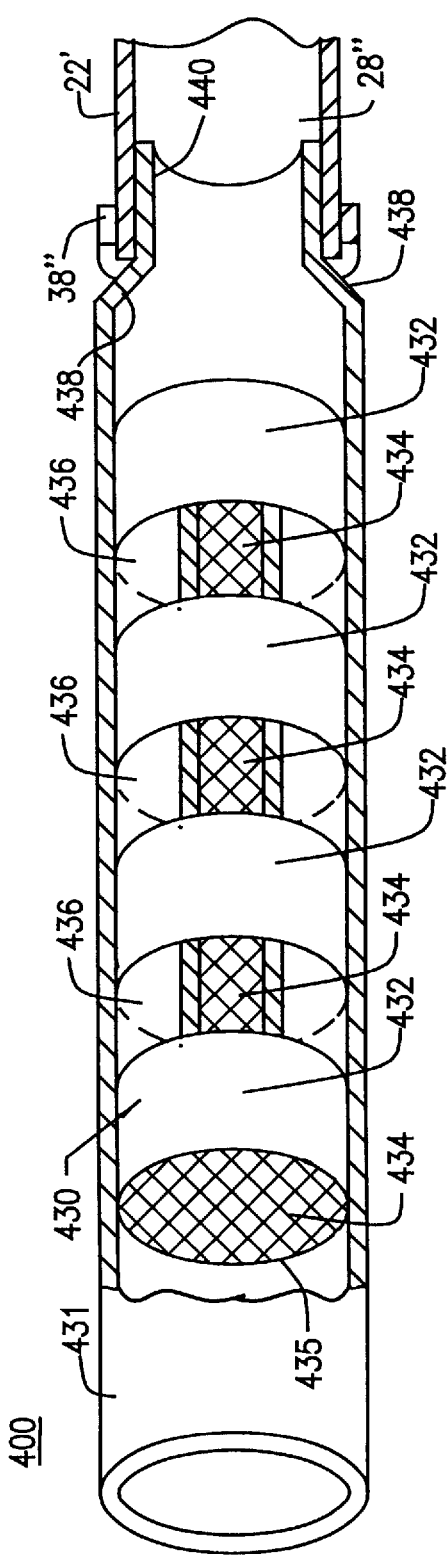
FIG. 7 shows the sixth embodiment of the present invention.

The sixth embodiment 400 of the tailpipe catalytic converter 430 is depicted in FIG. 7 of the drawings. The sixth embodiment 400 includes a tailpipe catalytic converter 430 which is the same as the fifth embodiment 300 of tailpipe catalytic converter 330, except for a larger sized canister-type housing 431 having larger diameter core housings 432 and matrix cores 434 and larger diameter spacing collars 436. Housing 431 has at one end a tapered end 438 with a neck portion 440 for inserting into tailpipe 22". Catalytic converter housing 431 has four core housings 432 having matrix cores 434 and one inch (1") length metal spacing collars 436 separating each matrix core 434, as shown in FIG. 7. Housing 431 is secured to tailpipe 22" by means of clamp 38", welding, crimping, or the like. The design of housing 431 insures that there is adequate exhaust gas flow with no back pressure being produced when catalytic converter 430 is attached to the open end 28 tailpipe 22".

The physical specifications for canister housing 431 are a diameter of 2.3 inches and a length of 13 inches. Housing 431 has a tapered end 438 having a diameter of less than 2 inches and a neck length of 2 inches for inserting neck portion 440 into tailpipe 22" for a proper fit. The physical specifications for each housing 432 having matrix core 434 are a diameter of 2.3 inches by 2 inches in length. The physical specification for each spacing collar 436 is a diameter of 2.3 inches by 1 inch in length. Thus, converter 430 has an overall length of 11 inches.

This embodiment was tested on a 1989 Jeep Wrangler. In these tests, housings 432 and matrices 434 had lengths of 2, 4, 6, and 8 inches, and were tested at speeds of 55 mph and 30 mph. The test results are tabulated below in Table 5. The matrix core 434 in the Jeep Wrangler was coated with alumina to about 12% (weight to weight) and had a catalytic layered substrate plating 435 of platinum and rhodium to about 50 grams per cubic foot with a ratio of platinum to rhodium of 5:1. This is a low light-off type of catalyst which achieves light off at 400° F. instead of 900° F., to thereby further increase the efficiency of the tailpipe catalytic converter of the present invention as shown in Table 5.

TABLE 5

Study of formulation on a 1989 Jeep Wrangler
Formula = 5:1 ratio platinum to rhodium coated to 50 grams per cubic foot
These are Steady State tests @ 55 mph and 30 mph
% reductions are based on the final baseline test.
VIN 2J4FY19E1KJ157111    Mileage 18877    Date February 14, 1996

| | Ambient conditions | | | | | | |
|---|---|---|---|---|---|---|---|
| Baro | THC | CO | NOx | CO2 | NMHC | Temp Dry | Temp wet |
| 746.2 | 17.71 | 10.1 | 0.07 | 0.046 | 8.3 | 70 | 68 |
| | Baseline @ 55 mph in fifth gear | | | | | | |
| | 42–49 | 111–123 | 16–20 | 1.921 | 16–17 | | |
| | 2 inches of substrate installed @ 55 mph | | | | | | |
| | 23–27 | 34–40 | 9.0–19.0 | 1.93 | 10.1 | | |
| % Reduc. | 39% | 51.90% | 26% | | | | |
| | 4 inches of substrate installed @ 55 mph | | | | | | |
| | 22–25 | 32–35 | 1.9–3.5 | 1.871 | 11.3 | | |
| % Reduc. | 42% | 56% | 85% | | | | |
| | 6 inches of substrate installed @ 55 mph | | | | | | |
| | 17.9–26 | 29–35 | 1.9–2.2 | 1.82 | 11.3–13.3 | | |
| % Reduc. | 46% | 58% | 89% | | | | |
| | 8 inches of substrate installed @ 55 mph | | | | | | |
| | 20–25 | 35–60 | 1.3–1.5 | 1.83 | 13.1 | | |
| % Reduc. | 45% | 38% | 92% | | | | |
| | Baseline @ 55 mph | | | | | | |
| | 37–45 | 69–85 | 16–22 | 1.9 | 13 | | |
| | Baseline @ 30 mph in third gear | | | | | | |
| | 21–23 | 63–85 | 4.0–6.0 | 1.034 | 10.5 | | |
| | 2 inches of substrate installed at 30 mph | | | | | | |
| | 19–24 | 27–100 | 0.9–3.1 | 0.972 | n/r | | |
| % Reduc. | 15% | 36.50% | 71% | | | | |
| | 4 inches of substrate installed @ 30 mph | | | | | | |
| | 18–24 | 40–55 | 0.8–1.2 | 0.939 | 9.6 | | |
| % Reduc. | 17.60% | 52% | 86% | | | | |
| | 6 inches substrate insalled @ 30 mph | | | | | | |
| | 17.9–19.1 | 46–66 | 0.2–0.9 | 0.929 | n/r | | |
| % Reduc. | 27.50% | 46% | 93% | | | | |

TABLE 5-continued

Study of formulation on a 1989 Jeep Wrangler
Formula = 5:1 ratio platinum to rhodium coated to 50 grams per cubic foot
These are Steady State tests @ 55 mph and 30 mph
% reductions are based on the final baseline test.
VIN 2J4FY19E1KJ157111       Mileage 18877      Date February 14, 1996

|  | 8 inches of substrate installed @ 30 mph | | | | |
|---|---|---|---|---|---|
| % Reduc. | 15.3–19.2 32.20% | 38–57 52% | 0.3–0.6 93% | 0.981 | n/r |
| | Baseline @ 30 mph | | | | |
| | 24–27 | 90–110 | 6.0–8.0 | 1.14 | 10.8 |

DETAILED DESCRIPTION OF THE SEVENTH EMBODIMENT 500

Figure 8:
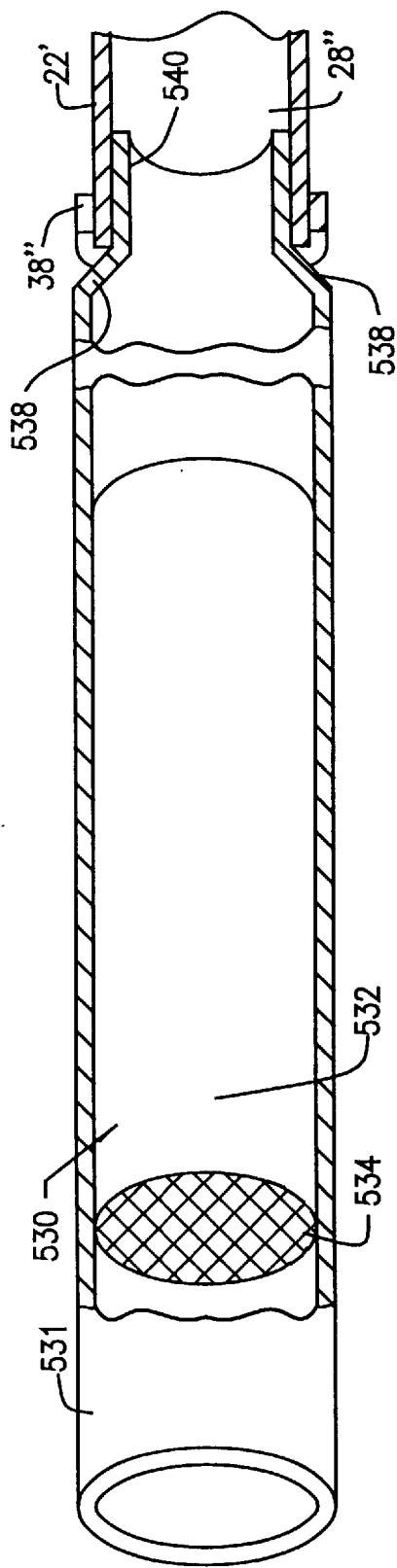
FIG. 8 shows the seventh embodiment of the present invention.

The seventh embodiment 500 of the tailpipe catalytic converter 530 is depicted in FIG. 8 of the drawings. The seventh embodiment 500 includes a tailpipe catalytic converter 530 which is the same as the sixth embodiment 400 of tailpipe catalytic converter 430, except for a shorter length of canister-type housing 531 having a single integral core housing 532 for housing a single integral matrix core 534. The design of housing 531 also insures that there is adequate exhaust gas flow with no back pressure being produced because of catalytic converter 530 being attached to the open end 28 tailpipe 22".

Housing 531 has a diameter of ¼ inches to 4 inches larger than the inside diameter of the tailpipe 22", and preferably ½ inch to 1 inch larger than the inside diameter of the tailpipe. The preferred physical specifications for housing 531 are a diameter of 2¾ inches and a length of 12 inches. Housing 531 has a tapered end 538 having a diameter of less than 2 inches and a neck length of 2 inches for inserting neck portion 540 into tailpipe 22" for a proper fit. Converter 530 has an overall length of 8 inches.

DETAILED DESCRIPTION OF THE EIGHTH EMBODIMENT 600

The eighth embodiment 600 of the tailpipe catalytic converter 630 is depicted in FIG. 9 of the drawings. The eighth embodiment 600 includes a tailpipe catalytic converter 630 disposed in a housing 631 which is the same as the sixth embodiment 400, except for the tapered and conical end 642 with an exhaust opening 644. The tapered and conical end 642 allows for the creation of back pressure within housing 631 which generates more heat (+ΔT) for increased catalytic conversion of vehicle exhaust gases by the core housings 632 having matrix cores 634 of catalytic converter 630. In addition, the tapered and conical configuration 642 of housing 631 also reduces noise and becomes an additional vehicle muffler.

The physical specifications for housing 631 has an overall diameter in the range of 2¼ to 2¾ inches and overall length in the range of 15 to 17 inches, with a preferred overall diameter of 2½ inches and a preferred length of 16 inches. Housing 631 has a tapered end 638 having a diameter of less than 2 inches and a neck length of 2 inches for inserting neck portion 640 into tailpipe 22" for a proper fit. The tapered and conical end 642 has a 2 inch length with an exhaust hole diameter opening 644 of 2 inches. The physical specification for each core housing 632 and matrix core 634 has an overall diameter of 2⅜ inches by 2 inches in length. The physical specification for spacing collar 636 has an overall diameter of 2⅜ inches by 1 inch in length. Thus, converter 530 has an overall length of 11 inches.

DETAILED DESCRIPTION OF THE NINTH EMBODIMENT 700

The ninth embodiment 700 of the tailpipe catalytic converter 730 is depicted in FIG. 10 of the drawings. The ninth embodiment 700 includes a tailpipe catalytic converter 730 disposed in a canister housing 731 which is the same as the seventh embodiment 500, except for the tapered and conical end 742 with an exhaust opening 744. The tapered and conical end 742 also allows for the creation of back pressure within housing 731 which generates more heat (+ΔT) for increased catalytic conversion of vehicle exhaust gases by the single core housing 732 having a single integral matrix core 734. In addition, this tapered and conical configuration 742 of housing 731 also reduces noise and becomes an additional vehicle muffler.

The physical specifications for housing 731 are a diameter in the range of 2¼ to 2¾ inches and overall length in the range of 13 to 15 inches, with a preferred overall diameter of 2½ inches and a preferred length of 14 inches. Housing 731 has a tapered end 738 having a diameter of less than 2 inches and a neck length of 2 inches for inserting neck portion 740 into tailpipe 22" for a proper fit. The tapered and conical end 742 has a 2 inch length with an exhaust hole diameter opening 744 of 2 inches. The physical specification for core housing 732 having matrix core 734 has an overall diameter of 2⅜ inches by 7 inches in length.

DETAILED DESCRIPTION OF THE TENTH EMBODIMENT 800

Figure 11:
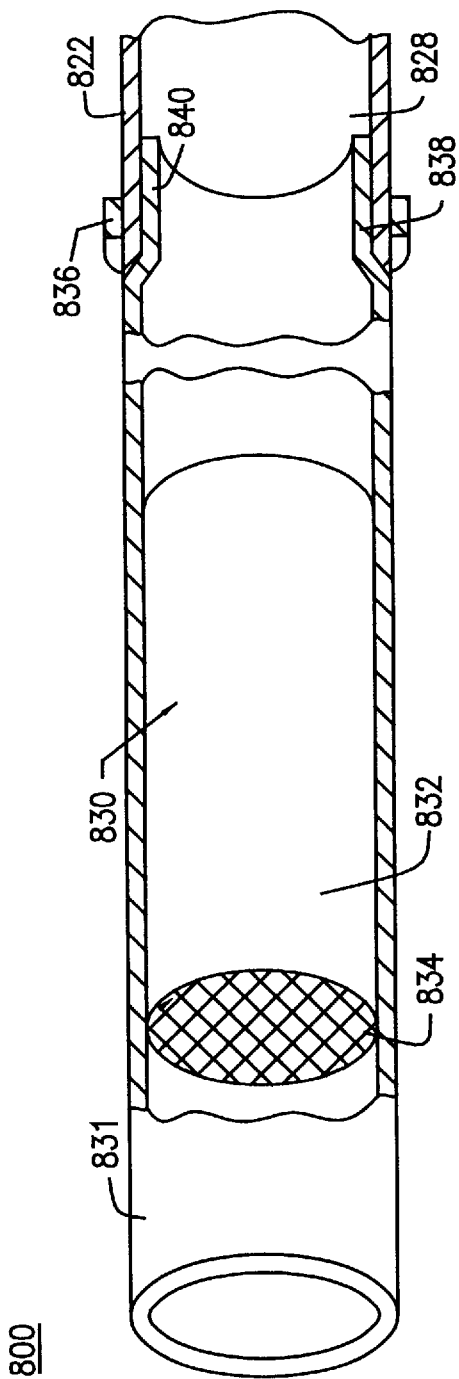
FIG. 11 shows the tenth embodiment of the present invention.

The tenth embodiment 800 of the tailpipe catalytic converter 830 is depicted in FIG. 11 of the drawings. The tenth embodiment 800 includes a tailpipe catalytic converter 830 which is the same as the third embodiment 130, except is disposed in a smaller sized canister-type housing 831 having a smaller diameter core housing 832 and matrix core 834. This catalytic converter 830 is used for scooters, motorcycles, lawn mowers, gasoline electrical generators, and the like. Housing 831 can be slid into open end 828 of tailpipe 822 and secured by means of clamp 836, welding, crimping, or the like.

The physical specifications for housing 831 are an overall diameter in the range of ½ inches to 1 inch and an overall length in the range 3 to 5 inches, with a preferred overall diameter of ¾ of an inch and a preferred length of 4 inches. Housing 831 has a tapered end 838 having a diameter of less than ¾ of an inch and a neck length of 1 inch for inserting neck portion 840 into tailpipe opening 828 of tailpipe 822 for a proper fit. The physical specifications of matrix core 834 are an overall diameter of $^{23}/_{32}$ of an inch by 2 inches in length.

DETAILED DESCRIPTION OF THE ELEVENTH EMBODIMENT 900

Figure 12:
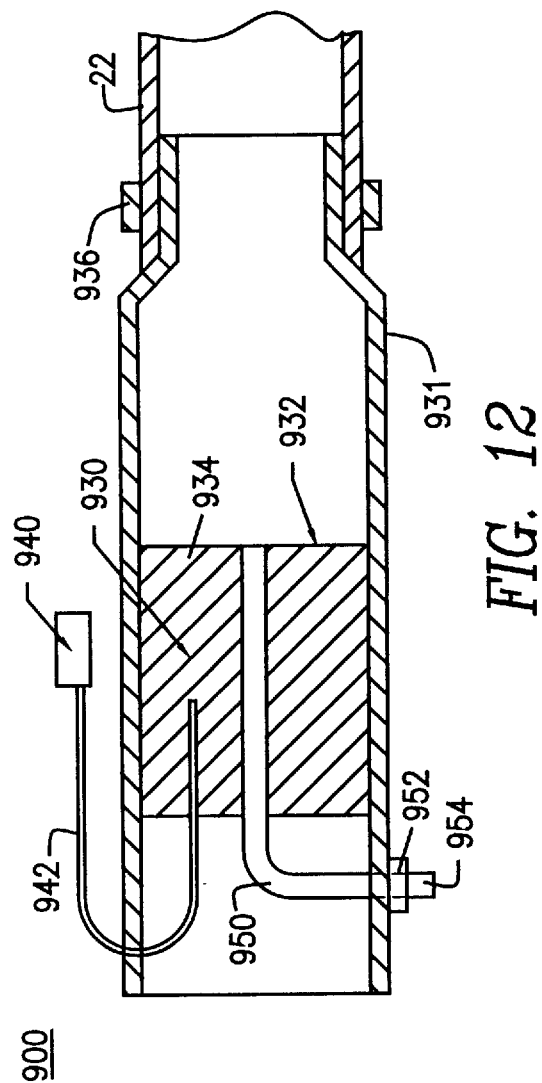
FIG. 12 shows the eleventh embodiment of the present invention.

The eleventh embodiment 900 shows a tailpipe catalytic converter 930 in FIG. 12 of the drawings, having a core housing 932 and a matrix core 934 disposed in a canister-type housing 931 which is connected to tailpipe 22 via clamp 936. Matrix core 934 is an electrically heated catalyst having embedded therein a thermocouple 942 having a thermocouple sensor 940. The thermocouple 940 is connected to a main computerized electronic control unit. Also embedded in the center of matrix core 934 is a heating element 950 connected to canister-type housing 931 by a ceramic nut 952. The end 954 is connected to a battery cable (not shown) for heating up the heating element 950. Electrical energy is supplied by the alternator of the vehicle.

Present matrix substrates start working at a temperature of about 400° F. when the exhaust gases reach that temperature. Typically, this takes 3 to 4 minutes, depending on the driving speed. Light off occurs when the substrate temperature is at 400° F. and is working at 50% efficiency.

In the present invention, when the electric heating element 950 is energized, the temperature of 400° F. is reached in approximately 10 seconds, so that light off starts earlier, and further increases efficiency.

Thermocouple sensor 940 senses the temperature of matrix core 934. When the vehicle is started, or at any time the temperature of core 934 is less than 400° F., thermocouple sensor 940 senses this temperature below 400° F., and causes heating element 950 to be energized to immediately heat up the core 934. When the temperature reaches 450° F., light off has been achieved and thermocouple sensor 940 turns off the heating element 950.

DETAILED DESCRIPTION OF THE TWELFTH EMBODIMENT 1000

Figure 13:
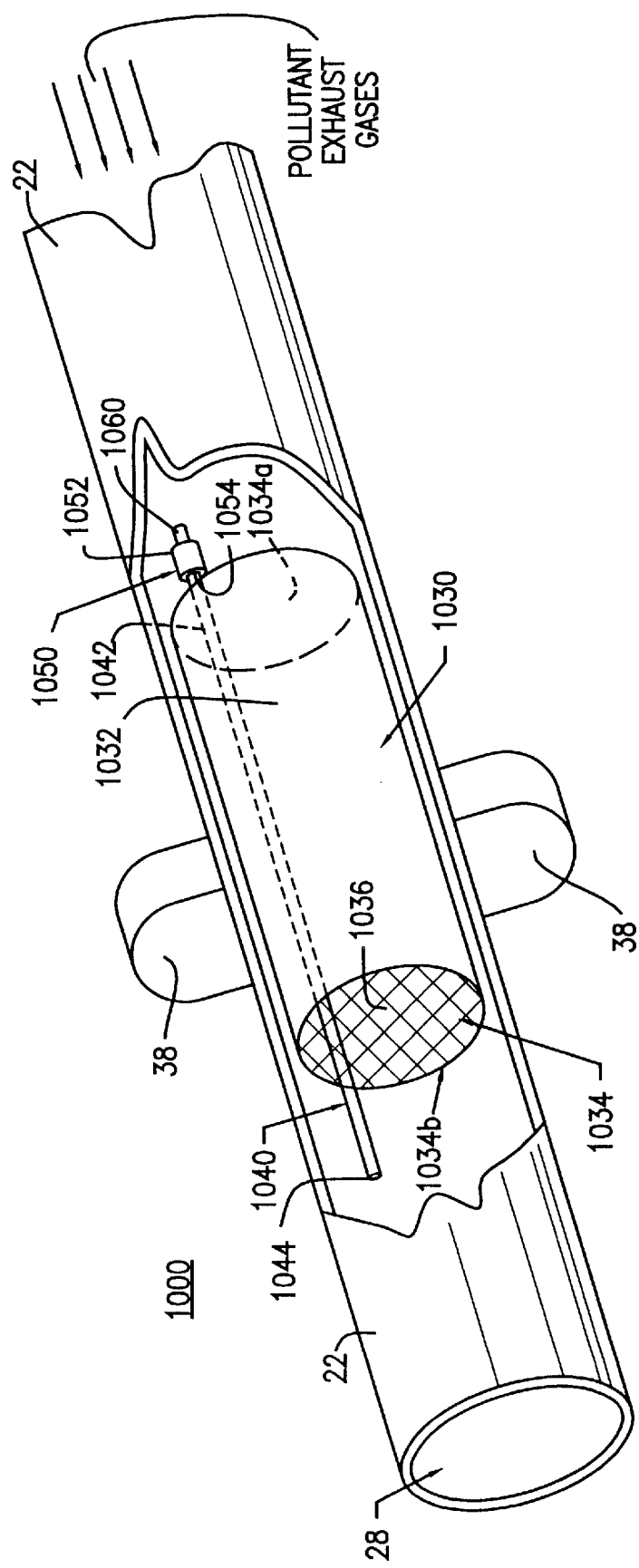
FIG. 13 shows the twelfth embodiment of the present invention.

The twelfth embodiment 1000 shows a tailpipe catalytic converter 1030 in FIG. 13 of the drawings. The tailpipe catalytic converter 1030, as depicted in FIG. 13, is of generally conventional construction and includes a cylindrical housing 1032 having disposed therein a matrix core 1034 of catalytic layered material 1036, which reacts with the emission of gaseous pollutants, such as THC, $NO_x$, NMHC, and CO. The matrix core 1034 has an inlet side or end 1034a and an outlet side or end 1034b. Within matrix core 1034 there is embedded a small diameter outlet tube 1040 having an inlet end 1042 and an outlet end 1044. A back pressure relief device 1050 is mounted at the inlet end 1042 and has inlet and outlet opening 1052 and 1054 for relieving any build-up of excess back pressure at the inlet end 1034a.

Figure 1A:
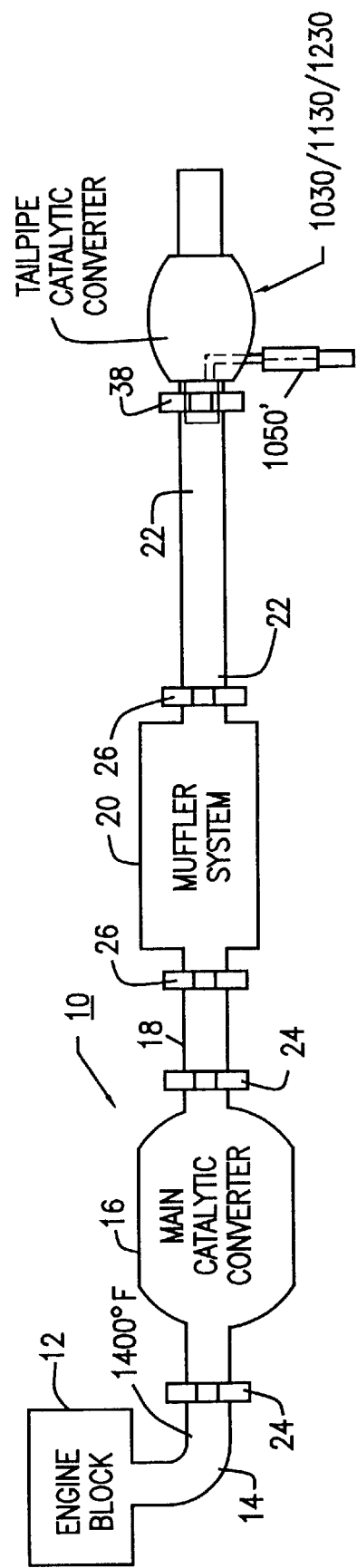
FIG. 1A is a bottom plan view of a standard vehicle exhaust system incorporating the catalytic converter with a back pressure relief device in the tailpipe of the present invention.

The back pressure relief device 1050 can be in the form of a bleed valve, a miniature check valve, a miniature pressure release valve, or any other suitable devices. In this twelfth embodiment 1000 the back pressure relief device 1050 is in the form of a bleed valve 1050. Bleed valve 1050 is always open and is dimensionally sized such that the exhaust gases only pass through inlet tube 1060 when the back pressure at the inlet end 1034a of catalytic converter 1030 excess 7 inches of water. If a check valve or pressure release valve is employed, they are normally closed and only open when the back pressure exceed 7 inches of water. There is an additional inlet tube 1060 connected to the inlet opening 1052 of pressure relief device 1050 for receiving of the exhaust gases in order to lower the back pressure of those aforementioned exhaust gases, when the tailpipe catalytic converter 1030 was placed within the exhaust emission system 10, as shown in FIG. 1A of the drawings.

In using a tailpipe catalytic converter without a back pressure relief device within an exhaust emission system 10, it is observed that when an excess back pressure of gases above a predetermined level is reached (greater than seven (7) inches of water pressure), the operation of the exhaust emission system 10 is hindered and the efficiency of the emission system 10 is reduced, as shown in Table 6. When using a tailpipe catalytic converter 1030 having a back pressure relief device 1050 it allows the exhaust gases to flow more evenly without any reduction in the efficiency of reducing exhaust gas emissions, as shown in Table 6. Some conditions that cause an increase in the back pressure of exhaust emission system 10 are heavy acceleration of the motor vehicle, wide open throttle operation, a sudden increase in vehicle load (climbing a steep hill), and the like.

It is also been observed that when the tailpipe catalytic converter 1030 is in use, the converter 1030 will slow the travel time of exhaust gases throughout the main catalytic converter 16, such that the added residence time through the main catalytic converter 16 further reduces the emission of gaseous pollutants from the exhaust emission system 10 during the operational use of the motor vehicle. Back pressure of the exhaust gases should be in the range of 2 to 7 inches of water within the exhaust system 10 for proper efficiency in reducing exhaust gas emissions.

Housing 1032 is made of ceramic, steel, stainless steel, chrome, or other suitable materials. The core matrix 1034 is made of mesh, honeycomb, or other suitable passageway designs for containing the catalytic layered substrates 1036. The catalytic layers 1036 have a precious metal catalyst contained thereon. Typical catalysts used are platinum, palladium, rhodium, and/or nickel. The housing 1032 of tailpipe catalytic converter 1030 is typically dimensioned so that the outside diameter closely approximates the inside diameter of tailpipe 22. The diameter size of housing 1032 may be in the range of ½ inches to 8 inches, and the housing 1032 may have a length of ¾ inches to 11 inches, depending upon the application, such as in a car, truck, motorcycle, lawn mower, gasoline-type generator, and/or stationary internal combustion engine.

The preferred specification of matrix core 1034 includes a diameter which matches the tailpipe of 1¾ inches and a length of 1¾ inches and having a range of 200 to 700 cells per square inch. Typically, two, three, or four of such matrix cores 1034 are stacked together to make the tailpipe catalytic converter 1030 or with a preferred single integral matrix core 1034 having a length of 6 inches. The matrix core 1034 is coated with alumina to about 12% (weight to weight) and has a catalytic layered substrate plating 1036 of palladium and platinum in the range of 30 to 50 grams per cubic foot with a ratio of palladium to platinum in the range of 2:1 to 6:1.

The tailpipe catalytic converter 1030 is held in place in tailpipe 22 by a suitable mounting clamp 38, as depicted in FIG. 1A, and 13. It can also be securely held by other suitable means, such as hose clamps, muffler clamps, compression fittings, mounting brackets, mounting screws, welding, crimping, and the like.

DETAILED DESCRIPTION OF THE THIRTEENTH EMBODIMENT 1100

Figure 14:
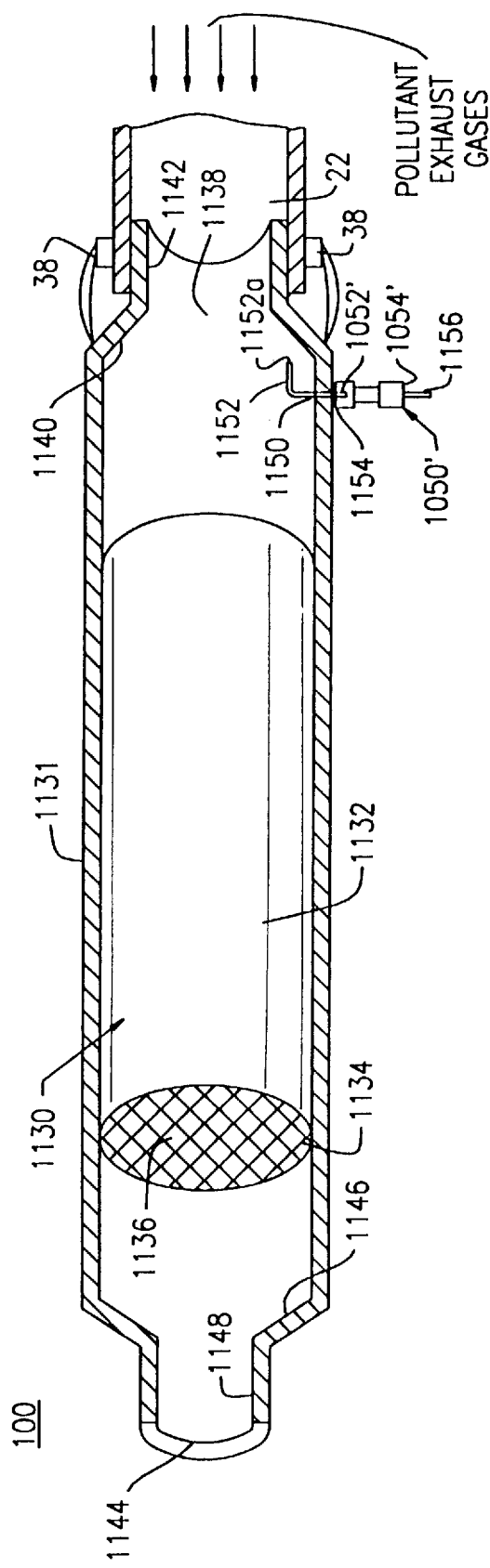
FIG. 14 shows the thirteenth embodiment of the present invention.

The thirteenth embodiment 1100 of the tailpipe catalytic converter 1130 is depicted in detail in FIG. 14 of the drawings. Tailpipe catalytic converter 1130 includes a large sized canister-type housing 1131 having a large sized diameter core housing 1132 having a single integral matrix core 1134 of catalytic layered material 1136 (as described in the twelfth embodiment). Housing 1131 has at the inlet opening 1138 a tapered end 1140 with a neck portion 1142 for slidably inserting into the end opening 28 of the tailpipe section 22; and at the outlet opening 1144 a tapered end 1146 with a neck portion 1148 for the discharging of the exhaust gases to the atmosphere. In addition, housing 1131 at the side of the inlet opening 1138, as shown in FIG. 14 of the drawings, includes a circular hole opening 1150 for receiving an L-shaped inlet tube 1152 having an outlet section 1154 for receiving the back pressure relief device 1050'.

The back pressure relief device 1050' can be in the form of a bleed valve, a miniature check valve, a miniature pressure release valve, or any other suitable devices. In this thirteenth embodiment 1100 the back pressure relief device is in the form of a miniature check valve 1050'. Check valve 1050' is normally in the closed position and only opens to release the excess exhaust gases when the back pressure at the inlet tube opening 1152a of L-shaped inlet tube 1152 exceeds the 7 inches of water back pressure. If a bleed valve is employed, the valve is always opened and is dimensionally sized such that the excess exhaust gases only pass through when the back pressure exceeds 7 inches of water. If a pressure relief valve is employed, the valve is normally closed and only opens when the back pressure exceeds 7 inches of water. Check valve 1050' includes an inlet opening 1052' and an outlet opening 1054', such that inlet opening 1052' connects to the outlet section 1154 of L-shaped tube 1152, and outlet opening 1054' connects to an outlet tube 1156 for discharging the excess back pressure within the exhaust emissions system 10 to the atmosphere. Housing 1131 is secured to the end opening 28 section of the tailpipe section 22 by means of clamps 38, welding, crimping or the like. In addition, the tapered and conical configuration of housing 1131 also reduces noise and becomes an additional vehicle muffler.

The physical specifications for housing 1131 has an overall diameter in the range of 3½ inches to 4½ inches and overall length in the range of 3 inches to 15 inches, with a preferred overall diameter of 4⅛ inches and a preferred length of 4 inches. Housing 1131 has inlet and outlet openings 1138 and 1144 of tapered ends 1140 and 1146 having a diameter of less than 2 inches for inserting the neck portion 1142 into the open end 28 of the tailpipe section 22 for a proper fit. The physical specification for core housing 1132 having a matrix core 1134 has an overall diameter of 4 inch by 4 inches in length.

DETAILED DESCRIPTION OF THE FOURTEENTH EMBODIMENT 1200

Figure 15:
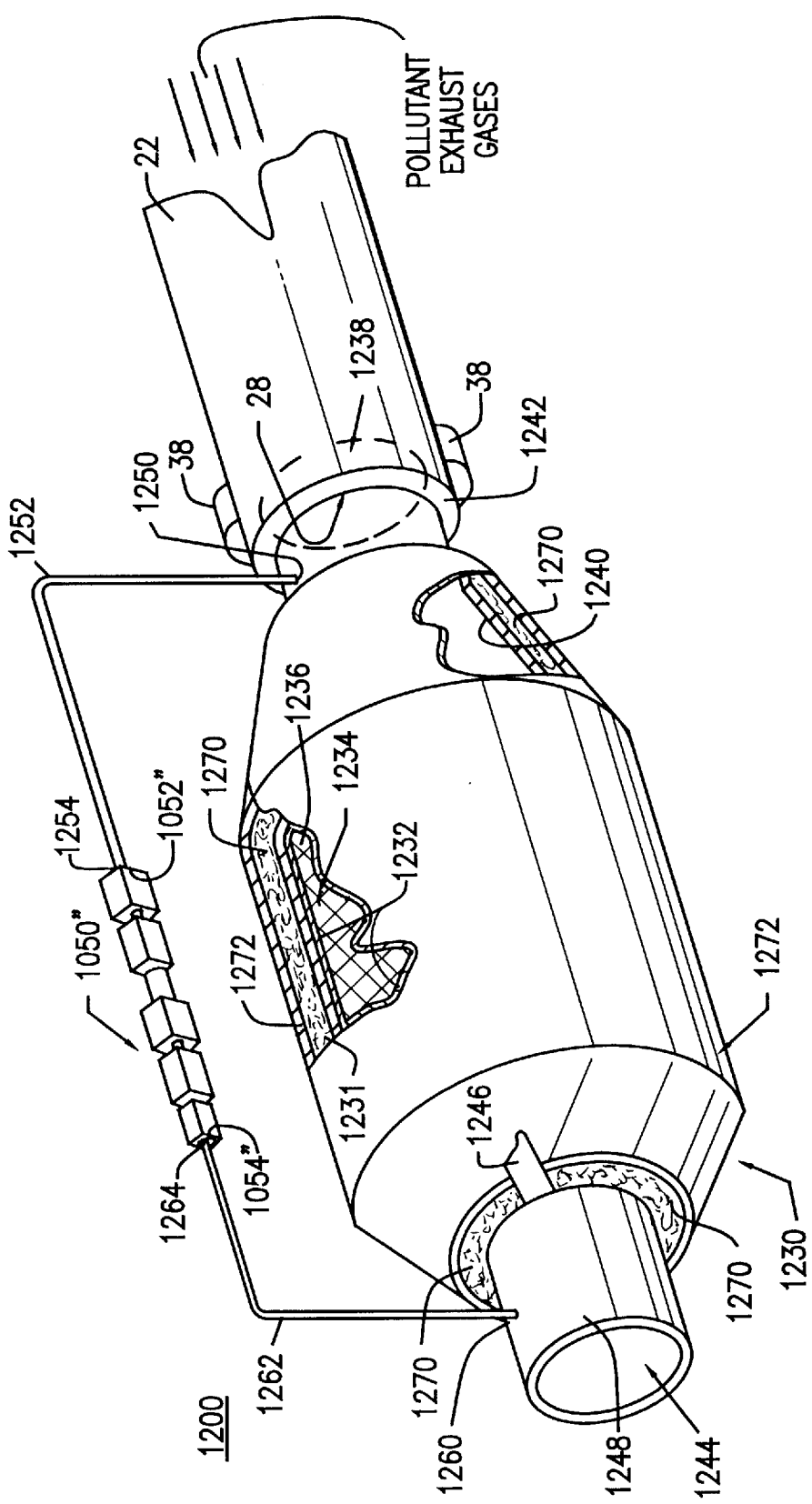
FIG. 15 shows the fourteenth embodiment of the present in invention.
Figure 16:
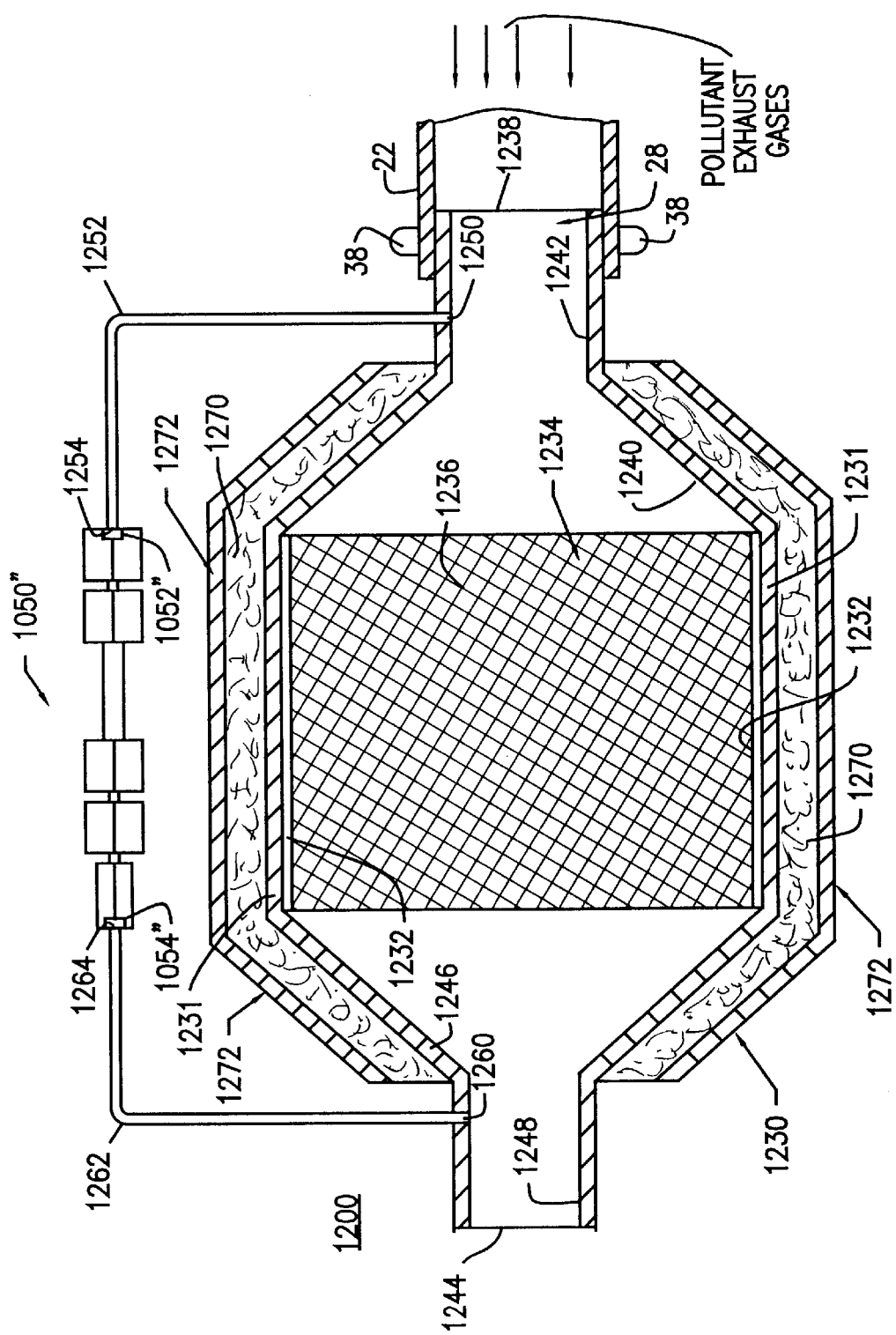
FIG. 16 shows the cross-sectional view of the fourteenth embodiment of the present invention.

The fourteenth embodiment 1200 of the tailpipe catalytic converter 1230 is depicted in detail in FIGS. 15 and 16 of the drawings. Tailpipe catalytic converter 1230 includes a large sized canister-type housing 1231 having a large sized diameter core housing 1232 having a single integral matrix core 1234 of catalytic layered material 1236 (as described in the twelfth embodiment) Housing 1231 has at the inlet opening 1238 a tapered end 1240 with a neck portion 1242 for slidably inserting into the open end 28 of the tailpipe section 22; and at the outlet opening 1244 a tapered end 1246 with a neck portion 1248 for the discharging of the exhaust gases to the atmosphere. In addition, housing 1231 at the side of inlet neck portion 1242, as shown in FIG. 16 of the drawings, includes a first circular hole opening 1250 for receiving an L-shaped inlet tube 1252 having an outlet end 1254 for receiving the back pressure relief device 1050"; and the outlet neck portion 1248 side includes a second circular hole opening 1260 for receiving an L-shaped outlet tube 1262 having an inlet end 1264 in which to receive the back pressure relief device 1050" or relief valve 1050".

The back pressure relief device 1050" can be in the form of a bleed valve, a miniature check valve, a miniature pressure release valve, or any other suitable devices. In this fourteenth embodiment 1200 the back pressure relief device is in the form of a miniature pressure release valve 1050". Pressure release valve 1050" is normally in the closed position and only opens to release the excess exhaust gases when the back pressure at inlet opening 1250 of L-shaped inlet tube 1252 is over the 7 inches of water back pressure. If a bleed valve is employed, the valve is always opened and is dimensionally sized such that the excess exhaust gases only pass through when the back pressure exceeds 7 inches of water. If a check valve is employed, the valve is normally closed and only opens when the back pressure exceeds 7 inches of water. Back pressure release valve 1050" includes inlet and outlet openings 1052" and 1054", such that inlet opening 1052" connects to the outlet end 1254 of L-shaped inlet tube 1252 and outlet opening 1054" connects to the inlet end 1264 of outlet tube 1262 for discharging the excess back pressure within the exhaust emissions system 10. Housing 1231 is secured to the open end 28 section of the tailpipe section 22 by means of clamps 38, welding, crimping or the like. In addition, the tapered and conical configuration of housing 1231 also reduces noise and becomes an additional vehicle muffler.

In addition, the tailpipe catalytic converter 1230 further includes an insulation layer 1270 that surrounds the exterior of housing 1231. Insulation layer 1270 is held in place by an outer canister-type shell 1272, as depicted in FIGS. 15 and 16 of drawings.

In operation, the emission removal efficiency was increased from baseline by using an insulated tailpipe catalytic converter 1230 because the emission exhaust gases were still maintained at a relatively high temperature (500° F. to 600° F.) within the matrix core 1234 of the tailpipe catalytic converter 1230. Shell 1272 is made of steel, stainless steel, chrome or other suitable materials. Insulation layer 1270 can be made of high temperature fiberglass, silicon fiberglass, intumescent coated materials, asbestos, and the like.

The physical specifications for housing 1231 has an overall diameter in the range of 3½ inches to 4½ and overall length in the range of 3 inches to 15 inches, with a preferred overall diameter of 4⅛ and a preferred length of 4 inches. Housing 1231 has inlet and outlet openings 1238 and 1244 of tapered ends 1240 and 1246 having a diameter of less than 2 inches for inserting the neck portion 1242 into the open end 28 of the tailpipe section 22 for a proper fit. The physical specification for core housing 1232 having a matrix core 1234 has an overall diameter of 4 inches by 4 inches in length. The insulation layer 1270 is approximately ½ of an inch in thickness. The overall diameter of the insulated auxiliary catalytic converter 1230 is in the range of 4½ to 5½ inches, with a preferred overall diameter of 5⅛ inches.

The present invention of a catalytic converter with a back pressure relief device has been tested on different vehicle exhaust systems 10, such as a 1992 Chrysler Cherokee, a 1989 Mitsubishi Raider, and a 1989 Dodge Aires LE. In these tests, as shown in Table 6, the catalytic converter 1230 of the fourteenth embodiment 1200 had a housing 1232 which measured 8 inches in length and had a diameter of 5 inches with a back pressure bleed valve 1050" having an orifice diameter of 0.015 inches (orifice # 15 in Table 6) or 0.017 inches (orifice # 17 in Table 6). The matrix core 1234 had a substrate diameter of 3.66 inches with 400 cells per inch of catalytic layered material 1236 having a ratio of palladium to platinum of 2:1. In test groups A through F, the catalytic converter 1230 was located and clamped by clamp 38 at the end 28 of the tailpipe 22. Test groups C and F had a catalytic converter 1230 with and without insulation layer 1270 (referred to as "No Insul" or "W/Insul" in Table 6) on housing 1232, as shown in FIG. 16. In Table 6, "3.66" refers to the 3.66 inch diameter of matrix core 1234 and "Baseline" refers to test groups A through F where there was no catalytic converter at all used in measuring the exhaust emissions. In test groups A and F "Dummy (Uncoated) Cat" refers to matrix core 1234 having no reactive substrate layers 1236 of palladium to platinum thereon.

The test results are tabulated below in Table 6, which show a substantial reduction in exhaust emissions of THC, CO and $NO_x$, when the catalytic convert 1230 is mounted at the end 28 of tailpipe 22. The best overall results occurred in test groups C and F when the catalytic converter 1230 included an insulation layer 1270 on housing 1232, such that the THC pollutants had a 20.0% and 31.1% reduction over baseline, respectively, the CO pollutant had a 34.1% and 19.2% reduction over baseline, respectively, and the $NO_x$, pollutants had a 28.2% and 71.7% reduction over baseline, respectively.

Another advantage of the present invention is that it provides for a catalytic converter that in operational use provides substantially cleaner air emissions for a vehicle having installed the tailpipe catalytic converter of the present invention.

Another advantage of the present invention is that it provides for a tailpipe catalytic converter having a back pressure relief valve that maintains the back pressure of the emission system at a predetermined level.

Another advantage of the present invention is that it provides for a tailpipe catalytic converter having a back pressure relief valve that allows excess back pressure to be diverted from the tailpipe catalytic converter and to bypass the inner core to maintain the efficiency of the system.

Another advantage of the present invention is that it provides for a tailpipe catalytic converter having a back pressure relief valve that is in the form of either a bleed valve, or a miniature check valve, or a miniature pressure relief valve for relieving any build-up of pressure within the emission system at the inlet side of the tailpipe catalytic converter to maintain the efficiency of the system.

A further advantage of the present invention is that it provides for a catalytic converter for a tailpipe that only has to be changed at every 50,000 to 100,000 miles of driving use.

A still further advantage of the present invention is that it provides a catalytic converter for a tailpipe which can be

TABLE 6

| Test Group | Unit Type | Test # | Make | Model | TNC | CO | NOx | % Eff THC | % Eff CO | % Eff NOx |
|---|---|---|---|---|---|---|---|---|---|---|
| A | BASELINE | 1 | CHRYSLER | CHEROKEE | 0.027 | 1.130 | 0.110 | | | |
| | DUMMY(UNCOATED) CAT | 2 | CHRYSLER | CHEROKEE | 0.042 | 1.627 | 0.102 | −55.5 | −43.9 | 7.3 |
| | 3.66 W/ ORIFICE #17 | 3 | CHRYSLER | CHEROKEE | 0.026 | 0.826 | 0.077 | 3.7 | 28.9 | 30.0 |
| B | BASELINE | 4 | MITSUBISHI | RAIDER | 0.594 | 5.301 | 1.328 | | | |
| | 3.66 NO ORIFICE | 5 | MITSUSISHI | RAIDER | 0.686 | 5.404 | 0.995 | −15.5 | −1.9 | 25.1 |
| | 3.66 W/ ORIFICE #15 | 6 | MITSUBISHI | RAIDER | 0.525 | 4.011 | 0.961 | 11.6 | 24.3 | 27.6 |
| C | BASELINE | 7 | DODGE | AIRES LE | 0.420 | 9.098 | 0.404 | | | |
| | 3.66 W/ ORF #15 NO INSUL | 8 | DODGE | AIRES LE | 0.404 | 7.273 | 0.190 | 3.8 | 20.1 | 52.9 |
| | 3.66 W/ ORF #15 W/INSUL | 9 | DODGE | AIRES LE | 0.336 | 5.998 | 0.276 | 20.0 | 34.1 | 31.7 |
| D | BASELINE | 10 | CHRYSLER | CHEROKEE | 0.062 | 1.588 | 0.369 | | | |
| | DUMMY(UNCOATED) CAT | 11 | CHRYSLER | CHEROKEE | 0.054 | 1.443 | 0.309 | 12.9 | 9.1 | 16.3 |
| | 3.66 W/ORIFICE #17 | 12 | CHRYSLER | CHEROKEE | 0.055 | 1.082 | 0.265 | 11.3 | 31.9 | 28.2 |
| E | BASELINE | 13 | MITSUBISHI | RAIDER | 0.223 | 2.241 | 0.633 | | | |
| | 3.66 NO ORIFICE | 14 | MITSUBISHI | RAIDER | 0.220 | 2.111 | 0.533 | 1.3 | 5.8 | 15.8 |
| | 3.66 W/ ORIFICE #15 | 15 | MITSUBISHI | RAIDER | 0.169 | 1.528 | 0.607 | 24.2 | 31.8 | 4.1 |
| F | BASELINE | 16 | DODGE | AIRES LE | 0.244 | 5.709 | 0.290 | | | |
| | 3.66 W/ORF #15 NO INSUL | 17 | DODGE | AIRES LE | 0.253 | 5.529 | 0.283 | −3.7 | 3.2 | 2.4 |
| | 3.66 W/ORF #15 W/INSUL | 18 | DODGE | AIRES LE | 0.166 | 4.611 | 0.082 | 31.1 | 19.2 | 71.7 |

ADVANTAGES OF THE PRESENT INVENTION

Accordingly, the primary advantage of the present invention is that it provides a catalytic converter disposed in or at the end of the tailpipe to further reduce exhaust gas emissions to meet the regulations of federal and state emission standards.

Another advantage of the present invention is that it provides a catalytic converter disposed in or at the end of the tailpipe, such that it is easy and simple to connect the catalytic converter to the end of a tailpipe by hose clamps, muffler clamps, compression fittings, mounting brackets, mounting screws, welding, crimping, or the like.

Another advantage of the present invention is that it provides a catalytic converter that can be mounted internally in the open end of the tailpipe, or as an extension to the end of the tailpipe.

Another advantage of the present invention is that it provides for a catalytic converter that in operational use performs with no reduction or loss of horsepower to a vehicle.

mass produced in an automated and economical manner and is relatively inexpensive and long lasting.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An exhaust system of a vehicle having exhaust piping connected to an exhaust tailpipe, a main catalytic converter disposed in said exhaust piping, and a tailpipe catalytic converter for installing in said exhaust tailpipe, said exhaust tailpipe having an open end, comprising:

a) a main catalytic converter disposed in said exhaust piping; a tailpipe catalytic converter including a housing having an exterior wall and an inner core of catalytic material disposed in said housing for chemically reducing pollutant gaseous emissions; said tailpipe catalytic converter having an inner end and an outer end;

b) said tailpipe catalytic converter being disposed within said exhaust tailpipe wherein said outer end is adjacent the open end of said exhaust tailpipe;

c) means for fixedly attaching said tailpipe catalytic converter to said exhaust tailpipe; and d) means for relieving back pressure within said exhaust tailpipe between said main catalytic converter and said tailpipe catalytic converter by partially diverting exhaust gases to bypass said inner core when the exhaust pressure at said inner end of said tailpipe catalytic converter increases above a predetermined pressure level, said means for relieving back pressure being located at said inner end of said tailpipe catalytic converter; wherein said means for relieving back pressure within said exhaust tailpipe includes valve means selected from the group consisting off a bleed valve, a check valve and a pressure relief valve; and wherein said valve means maintains the back pressure within said exhaust tailpipe at a level above 2 inches of water and below 7 inches of water.

2. An exhaust system in accordance with claim 1, wherein said means for relieving back pressure further includes a pipe extending through said inner core of said tailpipe catalytic converter, said pipe having a first end disposed at the inner end of said tailpipe catalytic converter and having a second end disposed at the outer end of said tailpipe catalytic converter, and said valve means being connected to said first end and being disposed at said inner end of said tailpipe catalytic converter.

3. An exhaust system in accordance with claim 1, wherein said means for relieving back pressure further includes a tube having an outer section extending through said exterior wall of said housing to the atmosphere and is disposed at the inner end of said tailpipe catalytic converter, and said valve means being connected to said tube outer section.

4. An exhaust system in accordance with claim 1, wherein said means for relieving back pressure further includes a first tube extending through said exterior wall of said housing at an inner end of said housing, a second tube extending through the exterior wall of said housing at an outer end of said housing, said valve means being connected between said first and second tubes.

5. An exhaust system in accordance with claim 1, wherein said catalytic material has a catalytic substrate of platinum and rhodium, or platinum and palladium.

6. An exhaust system in accordance with claim 1, wherein said means for fixedly attaching is selected from the group consisting of hose clamps, muffler clamps, compression fittings, mounting brackets, mounting screws, welding, and crimping.

7. An exhaust system in accordance with claim 1, wherein said inner core of catalytic material is an integral unit disposed in said housing.

8. An exhaust system in accordance with claim 1, wherein said tailpipe catalytic converter has a diameter in the range of ½ inches to 8 inches and a length in the range of ¾ to 11 inches.

9. An exhaust system in accordance with claim 1, wherein said tailpipe catalytic converter has a diameter in the range of 3½ inches to 4½ inches and a length in the range of 3 inches to 15 inches.

10. An exhaust system of a vehicle having exhaust piping connected to an exhaust tailpipe, a main catalytic converter disposed in said exhaust piping, and a tailpipe catalytic converter for installing in said exhaust tailpipe, said exhaust tailpipe having an open end, comprising:

a) a main catalytic converter disposed in said exhaust piping; a tailpipe catalytic converter including a housing having an exterior wall and an inner core of catalytic material disposed in said housing for chemically reducing pollutant gaseous emissions; said tailpipe catalytic converter having an inner end and an outer end;

b) said inner end of said tailpipe catalytic converter being connected to the open end of said exhaust tailpipe, so that said housing extends from the open end of said exhaust tailpipe;

c) means for fixedly attaching said tailpipe catalytic converter to said exhaust tailpipe; and d) means for relieving back pressure within said exhaust tailpipe between said main catalytic converter and said tailpipe catalytic converter by partially diverting exhaust gases to bypass said inner core when the exhaust pressure at said inner end of said tailpipe catalytic converter increases above a predetermined pressure level, said means for relieving back pressure being located at said inner end of said tailpipe catalytic converter; wherein said means for relieving back pressure within said exhaust tailpipe includes valve means selected from the group consisting of a bleed valve, a check valve and a pressure relief valve; and wherein said valve means maintains the back pressure within said exhaust tailpipe at a level above 2 inches of water and below 7 inches of water.

11. An exhaust system in accordance with claim 10, wherein said means for relieving back pressure further includes a pipe extending through said inner core of said tailpipe catalytic converter, said pipe having a first end disposed at the inner end of said tailpipe catalytic converter hand having a second end disposed at the outer end of said tailpipe catalytic converter, and said valve means being connected to said first end and being disposed at said inner end of said tailpipe catalytic converter.

12. An exhaust system in accordance with claim 10, wherein said means for relieving back pressure further includes a tube having an outer section extending through said exterior wall of said housing to the atmosphere and is disposed at the inner end of said tailpipe catalytic converter, and said valve means being connected to said tube outer section.

13. An exhaust system in accordance with claim 10, wherein said means for relieving back pressure further includes a first tube extending through said exterior wall of said housing at an inner end of said housing, a second tube extending through the exterior wall of said housing at an outer end of said housing, said valve means being connected between said first and second tubes.

14. An exhaust system in accordance with claim 10, wherein said catalytic material has a catalytic substrate of platinum and rhodium, or platinum and palladium.

15. An exhaust system in accordance with claim 10, wherein said means for fixedly attaching is selected from the group consisting of hose clamps, muffler clamps, compression fittings, mounting brackets, mounting screws, welding, and crimping.

16. An exhaust system in accordance with claim 10, wherein said inner core of catalytic material is an integral unit disposed in said housing.

17. An exhaust system in accordance with claim 10, wherein said tailpipe catalytic converter has a diameter in the range of ½ inches to 8 inches and a length in the range of ¾ to 11 inches.

18. An exhaust system in accordance with claim 10, wherein said tailpipe catalytic converter has a diameter in the range of 3½ inches to 4½ inches and a length in the range of 3 inches to 15 inches.

19. An exhaust system in accordance with claim 10, wherein a section of said housing containing said inner core of catalytic material has a diameter larger than the diameter of the tailpipe.

20. An exhaust system in accordance with claim 10, wherein a section of said housing containing said inner core of catalytic material has a diameter substantially equal to the diameter of the tailpipe.

21. An exhaust system in accordance with claim 10, wherein said housing has an inner end and an outer end which are each tapered to form a reduced size opening for noise reduction.

22. An exhaust system in accordance with claim 10, further including a second housing surrounding said housing and defining a space therebetween; and insulation being disposed in said space for preventing loss of heat from said inner core.

* * * * *